United States Patent [19]

Ouchi et al.

[11] Patent Number: 4,651,236
[45] Date of Patent: Mar. 17, 1987

[54] WAVEFORM EQUALIZING CIRCUIT

[75] Inventors: Yasuhide Ouchi, Kokubunji; Hajime Aoi, Tachikawa; Takashi Tamura, Kokubunji; Kazuyoshi Nakabayashi; Takamasa Uchiyama, both of Odawara, all of Japan

[73] Assignee: Hitachi, Ltd., Tokyo, Japan

[21] Appl. No.: 817,037

[22] Filed: Jan. 8, 1986

Related U.S. Application Data

[63] Continuation of Ser. No. 484,845, Apr. 14, 1983, abandoned.

[30] Foreign Application Priority Data

Apr. 16, 1982 [JP] Japan .................................. 57-62426

[51] Int. Cl.⁴ ............................ G11B 5/09; G11B 5/03
[52] U.S. Cl. ...................................... 360/45; 360/65
[58] Field of Search ...................... 360/45, 46, 65, 67, 360/75

[56] References Cited

U.S. PATENT DOCUMENTS

| 3,430,215 | 2/1969 | Krossa et al. | 360/67 |
| 3,879,674 | 4/1975 | Dragon | 360/67 |
| 4,244,008 | 1/1981 | Holt | 360/65 |
| 4,306,257 | 12/1981 | Harmon | 360/67 |
| 4,314,287 | 2/1982 | Freeman et al. | 360/45 |
| 4,346,411 | 8/1982 | Buhler et al. | 360/67 |

Primary Examiner—Vincent P. Canney
Attorney, Agent, or Firm—Antonelli, Terry & Wands

[57] ABSTRACT

A waveform equalizing circuit including a delay line, an attenuator, and a differential amplifier applied with the outputs of the delay line and attenuator is disclosed in which the delay time of the delay line and the attenuation factor of the attenuator are changed in accordance with the characteristic of a waveform applied to the delay line and attenuator.

16 Claims, 7 Drawing Figures

WAVEFORM EQUALIZING CIRCUIT

This is a continuation of application Ser. No. 484,845, filed Apr. 14, 1983 now abandoned.

BACKGROUND OF THE INVENTION

The present invention relates to a waveform equalizing circuit, and more particularly to a circuit for processing a signal waveform read out by a magnetic head in a magnetic recording device so that the recording/reproducing characteristic of the magnetic recording device is equivalently improved.

A magnetic recording device such as a magnetic disc device is required to become larger in capacity and higher in recording density with the years. In order to attain a high recording density, it is necessary to enhance a bit density and a track density. The bit density can be made high by improving the performance of each a magnetic head and a magnetic recording medium and reducing the spacing between the head and recording medium.

However, a further improvement in each of the head and recording medium has become difficult. In recent years, there have been used such techniques as a signal waveform read out by the head is processed by a reproducing circuit so that the recording/reproducing characteristic of the magnetic recording device is equivalently improved.

As one of the above-mentioned techniques, a waveform equalizing circuit shown in FIG. 1 is known which is made up of a delay line 4, an attenuator 5 and a differential amplifier 3. Referring to FIG. 2, a side lobe of an input waveform 1 (indicated by a solid curve) read out by a magnetic head is cut off by the waveform equalizing circuit, and therefore an output 2 (indicated by a dotted curve) from the waveform equalizing circuit becomes small in spread of waveform. Accordingly, a frequency-characteristic of reproduced signal indicated by a solid line 6 in FIG. 3 is improved as indicated by a dotted line 7, and thus a pattern peak shift can be reduced.

The pattern peak shift is generated mainly by the intersymbol interference in a read-out waveform, and is small as the read-out waveform is narrower in width and sharper.

In magnetic recording devices, owing to variations in the characteristics of magnetic heads and magnetic recording mediums, the characteristic of reproduced waveform (especially, the width thereof) varies widely. Specifically, in a magnetic disc device, a waveform reproduced from an inner track on a magnetic disc is different from that reproduced from an outer track in the characteristic (or width) of waveform. That is, the pattern peak shift varies considerably, and therefore it is difficult to obtain an excellent recording/reproducing characteristic. In other words, in the conventional equalization circuit, since circuit constants such as a delay time and an attenuation factor are fixed, the effect of equalization, that is, a decrease in pattern peak shift is kept constant, and therefore equalization is excessive for some waveforms and deficient for other waveforms.

SUMMARY OF THE INVENTION

An object of the present invention is to provide a waveform equalizing circuit which can eliminate the above-mentioned drawback of the prior art, and can reduce the influence of a difference between the characteristics of read-out waveforms on the pattern peak shift to obtain a stable and excellent recording/reproducing characteristic.

In order to attain the above object, in a waveform equalizing circuit according to the present invention, circuit constants such as a delay time and an attenuation factor are changed in accordance with the characteristic of read-out waveform, to reduce the excess and deficiency of equalization, thereby performing a more effective equalization.

DESCRIPTION OF THE PREFERRED EMBODIMENTS

Figure 1:
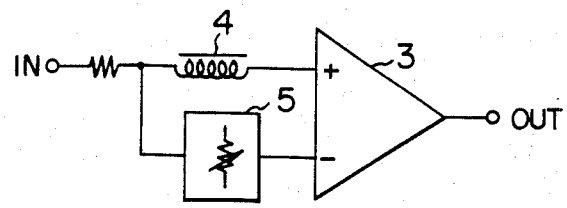
FIG. 1 is a circuit diagram showing an example of conventional equalization circuits.
Figure 2:
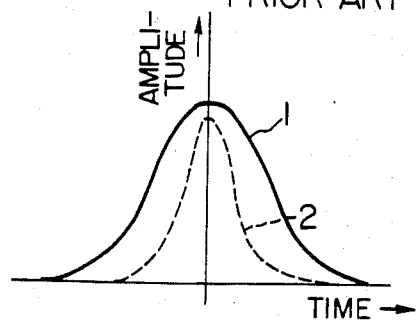
FIG. 2 is a graph showing input and output waveforms in the circuit shown in FIG. 1.
Figure 3:
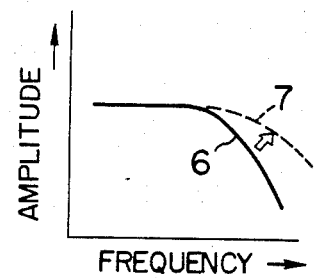
FIG. 3 is a graph showing frequency-characteristics of reproduced signal for explaining the effect of the circuit shown in FIG. 1.
Figure 4:
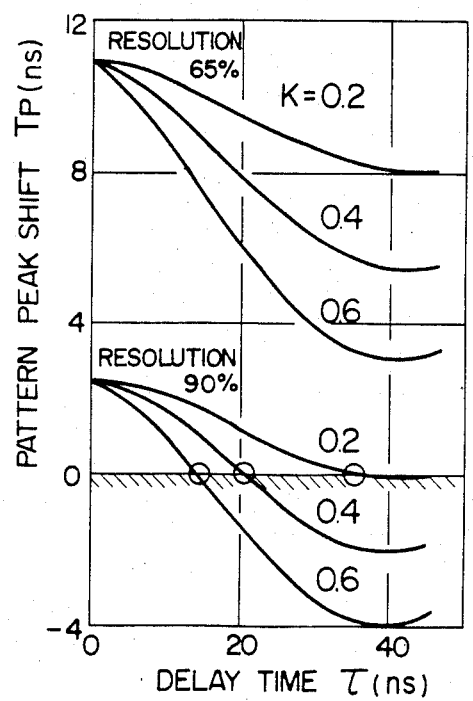
FIG. 4 shows relations between delay time and pattern peak shift for a plurality of values of attenuation factor.

FIG. 4 shows the variation of a pattern peak shift with a delay time $\tau$ and an attenuation factor K in the equalization circuit shown in FIG. 1. As is apparent from FIG. 4, the pattern peak shift can be varied by changing the delay time $\tau$ and attenuation factor K. Accordingly, in the case where respective characteristics of read-out waveforms are different from each other, that is, the waveforms are different in peak shift, neither too much nor too little equalization can be performed by using different delay times and attenuation factors. According to the present invention, the delay time $\tau$ and attenuation factor K are changed in a single reproducing circuit so that equalization suited for a waveform read out by a magnetic head can be effectively performed.

Figure 5:
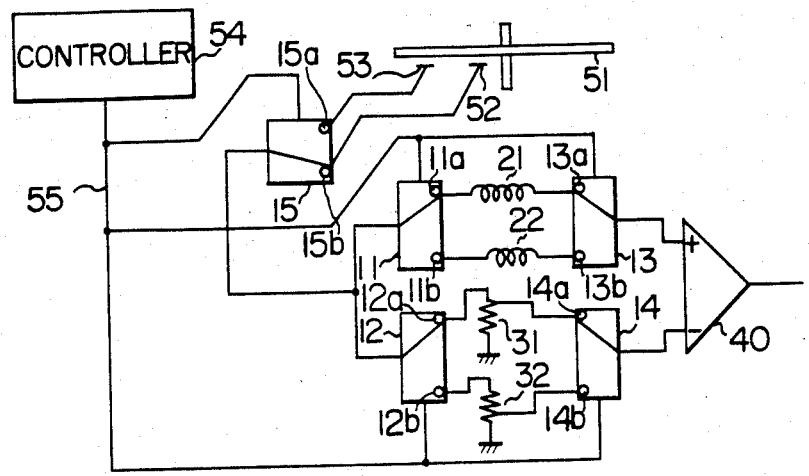
FIGS. 5 and 6 show embodiments of a waveform equalizing circuit according to the present invention.

FIG. 5 shows the circuit configuration of an embodiment of a waveform equalizing circuit according to the present invention. Referring to FIG. 5, those ends of two delay lines 21 and 22 which are placed on one side, are connected to terminals 13a and 13b of a changeover switch circuit 13, respectively, and the output side of the switch circuit 13 is connected to the positive input terminal of a differential amplifier 40. The delay lines 21 and 22 have delay times $\tau_1$ and $\tau_2$, respectively. Further, those ends of two attenuators 31 and 32 which are placed on one side, are connected to terminals 14a and 14b of a changeover switch circuit 14, respectively, and the output side of the switch circuit 14 is connected to the negative input terminal of the differential amplifier 40. The attenuators 31 and 32 have attenuation factors $K_1$ and $K_2$, respectively. Those ends of the delay lines 21 and 22 which are placed on the other side, are connected to terminals 11a and 11b of a changeover switch circuit 11, respectively, and those ends of the attenuators 31 and 32 which are placed on the other side, are connected to terminals 12a and 12b of a changeover switch circuit 12, respectively. Input terminals of the switch circuits 11 and 12 are connected in common to a changeover switch circuit 15. According to such a circuit configuration the delay time $\tau$ and attenuation factor K can be changed by changing the set state of each of the switch circuits 11 to 14 by a control signal, and thus equalization suited for a read-out waveform can be performed.

It is an important problem in practicing the present invention what kind of signal is used as the above-mentioned control signal. In the case where the present invention is applied to a magnetic disc device, it is possible to use as the control signal a magnetic head selection signal for determining which of inner and outer magnetic heads is to be used for a read-out operation.

As shown in FIG. 5, an ordinary magnetic disc device is provided with magnetic heads 52 and 53 corresponding respectively to inner and outer tracks on a recording disc 51 for the purpose of high-speed operation. Thus, a time necessary for a magnetic head to seek a desired track can be shortened. A head selection signal 55 for selecting one of the magnetic heads 52 and 53 is generated by a controller 54 which is included in the magnetic disc device. The head selection signal 55 is used as the control signal for the changeover switch circuits. In more detail, a waveform read-out by the magnetic head 52 or 53 is supplied to the switch circuit 15, and the set state of each of the switch circuits 11 to 15 is changed in accordance with the head selection signal 55 generated by the controller 54. For example, in the case where the inner head 52 is selected, the switch circuit 15 is set to the side of a terminal 15b, to select a waveform read out by the inner head 52, and the switch circuits 11 to 14 are set to the side of the terminals 11a to 14a, respectively. Thus, the delay line 21 having the delay time $\tau_1$ and the attenuator 31 having the attenuation factor $K_1$ are selected. On the other hand, in the case where the outer head 53 is selected, the switch circuit 15 is set to the side of a terminal 15a, to select a waveform read out by the outer head 53, and the switch circuits 11 to 14 are set to the side of the terminals 11b to 14b, respectively. Thus, the delay line 22 having the delay time $\tau_2$ and the attenuator 32 having the attenuation factor $K_2$ are selected. Accordingly, by appropriately setting the delay time $\tau$ of each delay line and the attenuation factor K of each attenuator, equalization suited for each of waveforms read out by the inner and outer heads can be performed, and therefore the influence of a difference between respective characteristics of waveforms read out by the inner and outer heads on the pattern peak shift can be reduced. Thus, the recording density can be made higher. According to experiments made by the present inventors, in the case where the delay line and attenuator corresponding to the inner head have a delay time $\tau_1$ of 35 ns and an attenuation factor $K_1$ of 0.2, respectively, and the delay line and attenuator corresponding to the outer head have a delay time $\tau_2$ of 30 ns and an attenuation factor $K_2$ of 0.1, respectively, favorable output waveforms are obtained. In a magnetic disc device, a signal waveform reproduced from an inner track on a magnetic disc is considerably different in pattern peak shift from that reproduced from an outer track on the magnetic disc, and therefore it is very effective to change over each of the delay time and attenuation factor from one of two values to the other.

Although both of the delay time and attenuation factor are changed in the above-mentioned embodiment, it is needless to say that only one of the delay time and attenuation factor may be changed.

Further, the control signal for changing the set state of each switch circuit is not limited to the head selection signal, but may be produced from a read-out signal itself. For example, the frequency-characteristic of a read-out signal, the resolution thereof, the half-amplitude pulse width of an isolated pulse or the like is measured and/or calculated. The results thus obtained are classified into a plurality of groups according to their rank, and a signal corresponding to each group is generated to be used as the control signal.

Figure 6:
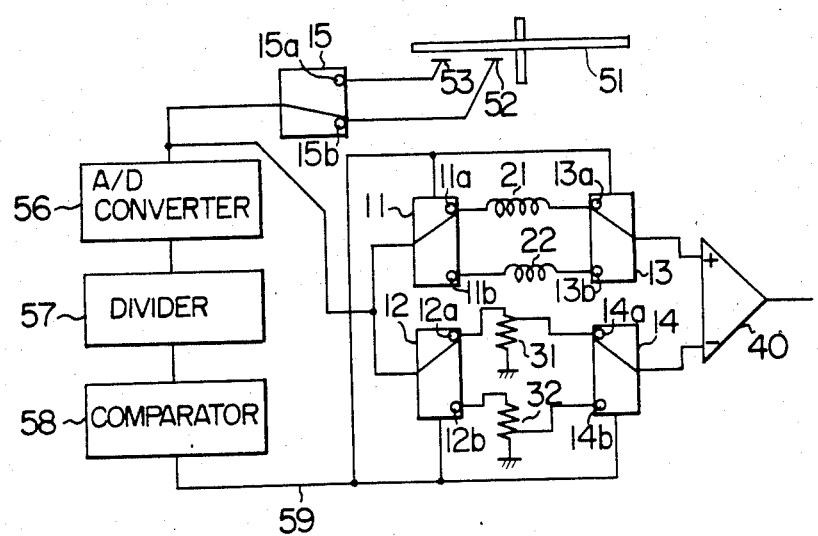

Next, explanation will be made on the case where a waveform equalizing circuit according to the present invention uses such a control signal. FIG. 6 shows the circuit configuration of another embodiment of a waveform equalizing circuit according to the present invention. In the present embodiment, an equalization characteristic is changed in accordance with an output resolution, which will be explained later. In FIGS. 5 and 6, like elements are given the same reference numerals. Referring to FIG. 6, a signal $D_1$ having a maximum recording frequency (for example, 8 MH) and a signal $D_2$ having a frequency (for example, 4 MH) equal to one half the maximum recording frequency are previously recorded in the track of a magnetic disc 51 at a predetermined position. A reproducing operation is performed in such a manner that the signals $D_1$ and $D_2$ are first read out. Reproduced outputs corresponding to the signals $D_1$ and $D_2$ are sampled from a signal which is reproduced by a magnetic head, by an analog-to-digital converter 56, to be converted into digital outputs. Then, an output resolution, that is, a ratio of the digital reproduced output (corresponding to the signal $D_1$ having the maximum recording frequency) to the digital reproduced output (corresponding to the signal $D_2$ having the frequency equal to one half the maximum recording frequency) is calculated by a divider 57. The output of the divider 57 is compared with a set value (for example, 0.9) by a comparator 58. When the output of the divider is equal to or greater than the set value, the comparator delivers an output having a level of "0". When the output of the divider is smaller than the set value, the comparator delivers an output having a level of "1". An output 59 from the comparator 58 is used as the control signal for switching. That is, the set state of each of changeover switch circuits 11 to 14 are changed in accordance with the control signal. Incidentally, the set state of a changeover switch circuit 15 is changed by the head selection signal 55 as in the embodiment shown in FIG. 5. In the present embodiment, for example, the set value in the comparator 58 is made equal to 0.9. Further, a delay time $\tau_1$ equal to 35 ns and an attenuation factor $K_1$ equal to 0.2 are used when the control signal takes the level of "1", that is, the output resolution is smaller than 0.9, and a delay time $\tau_2$ equal to 30 ns and an attenuation factor $K_2$ equal to 0.1 are used when the control signal takes the level of "0", that is, the output resolution is equal to or greater than 0.9. In this case, favorable output waveforms can be obtained in which variations in pattern peak shift are made small.

As mentioned above, according to the present embodiment, even when the characteristic of read-out waveform varies and therefore the output resolution also varies, optimum equalization can be performed in accordance with such variations, by appropriately setting the delay time $\tau$ of each delay line and the attenuation factor K of each attenuator. Thus, the effect of variations in read-out waveform on an equalizing operation can be reduced.

In the foregoing explanation, each of the delay time and attenuation factor takes only two values. The present invention is not limited to such a case, but it is possible to perform equalization in three or more stages by making the number of set values in the comparator equal to or greater than two and making each of the number of control signals, that of attenuators, that of delay lines, and that of switching terminals in each switch circuit equal to or greater than three.

Figure 7:
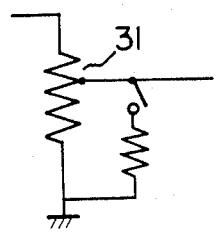
FIG. 7 shows an example of an attenuator used in the present invention.

In FIGS. 5 and 6, one of the attenuators 31 and 32 is selected by the switch circuits 12 and 14 connected to both ends of each of the attenuators. However, the attenuators 31 and 32 may have a structure shown in FIG. 7. In this case, one of the switch circuits 12 and 14 can be omitted.

Further, in the foregoing explanation, only a delay line is used as delay means. It is needless to say that any means for delaying an input, for example, a delay circuit can be used in place of the delay line in the present invention.

As has been explained in the foregoing, according to the present invention, an equalization characteristic is changed in accordance with the characteristic of read-out waveform, and therefore the effect of variations in read-out waveform on a pattern peak shift can be reduced. Thus, the function of an equalization circuit can be greatly improved.

What is claimed is:

1. A waveform equalizing circuit for use in a magnetic recording device for reproducing signals through a selected one of a plurality of head means for reproduction from a magnetic recording medium where signals are recorded, comprising:
    means for deriving a reproduced signal including means for calculating an output resolution from the signals reproduced from the selected one of said plurality of head means, and means for comparing the output from the calculating means with at least one predetermined value,
    means for attenuating the signal reproduced by the selected one of said plurality of head means by a predetermined amount,
    means for delaying the signal reproduced by the selected one of said plurality of head means by a predetermined amount, the predetermined amount in at least one of said attenuating means and delaying means being made variable on the basis of the output from said reproduced signal deriving means, and
    differential means for receiving the signals passed through said attenuating means and said delaying means.

2. A waveform equalizing circuit according to claim 1, wherein said reproduced signal deriving means includes an A/D converter for sampling two signals having different predetermined frequencies from the reproduced signal and digitizing the two signals, said calculating means including a divider for calculating the output resolution in accordance with the two signals, and said comparing means including a comparator for comparing the output from the divider with the at least one predetermined value.

3. A waveform equalizing circuit according to claim 1, wherein said attenuating means comprises a plurality of attenuators having attenuation amounts different from one another, and means for selecting the attenuator having a predetermined attenuation amount from said plurality of attenuators on the basis of the output from said reproduced signal deriving means.

4. A waveform equalizing circuit according to claim 1, wherein said delaying means comprise a plurality of delay lines having delay amounts different from one another, and means for selecting the delay line having a predetermined delay amount from said plurality of delay lines on the basis of the output of the reproduced signal.

5. A waveform equalizing circuit according to claim 1, wherein the magnetic recording device is a magnetic disc device including a rotary magnetic disc wherein signals are recorded and reproduced from different tracks on the rotary magnetic disc.

6. A waveform equalizing circuit according to claim 5, further comprising means for producing a head selection signal for selection of one of said plurality of head means for reproduction.

7. A waveform equalizing circuit for use in a magnetic recording device for reproducing signals through a selected one of a plurality of head means for reproduction from a recording medium where signals are recorded and including means for producing a head selection signal for selection of one of said plurality of head means for reproduction, comprising:
    means for attenuating the signal reproduced by the selected one of said plurality of head means by a predetermined amount, said attenuating means including a plurality of attenuators to be selected on the basis of said head selection signal,
    means for delaying the signal reproduced by the selected one of said plurality of head means by a predetermined amount, said delaying means including at least one delay line to be selected on the basis of said head selection signal, the predetermined amount in at least one of said attenuating means and said delaying means being made variable on the basis of said head selection signal so that the predetermined amounts in said attenuating means and said delaying means are kept constant while the same head means selected by said head selection signal is used for reproduction to thereby compensate for variations in characteristics of different ones of said plurality of head means, and
    only one differential amplifier for receiving signals passed through the respective selected ones of said attenuating means and said delaying means.

8. A waveform equalizing circuit according to claim 7, wherein said plurality of attenuators have attenuation amounts different from one another, and means for selecting one attenuator having a predetermined attenuation amount from said plurality of attenuators on the basis of said head selection signal.

9. A waveform equalizing circuit according to claim 7, wherein said delaying means comprises a plurality of delay lines having delay amounts different from one another, and means for selecting one delay line having a predetermined delay amount from said plurality of delay lines on the basis of said head selection signal.

10. A waveform equalizing circuit according to claim 7, wherein the magnetic recording device is a magnetic disc device including a rotary magnetic disc wherein signals are recorded and reproduced from different tracks on the rotary magnetic disc.

11. A waveform equalizing circuit for use in a magnetic recording device for reproducing signals through a selected one of a plurality of head means for reproduction from a recording medium where signals are recorded and including means for producing a head selection signal for selection of one of said plurality of head means for reproduction, comprising:

- a plurality of attenuators having different amounts of attenuation from one another, each attenuator enabling attenuation of a signal reproduced by the selected one of said plurality of head means by a predetermined amount on the basis of said head selection signal;
- at least one delay line enabling delay of the signal reproduced by the selected one of said plurality of head means by a predetermined amount on the basis of said head selection signal;
- first switching means for selecting one of said plurality of attenuators;
- second switching means for selecting one of said at least one delay lines; and
- only one differential amplifier for receiving the signals passed through the respective selected ones of said attenuator selected by said first switching means and said delay line selected by said second switching means.

12. A waveform equalizing circuit according to claim 11, wherein said first and second switching means are switched in response to said head selection signal.

13. A waveform equalizing circuit according to claim 11, wherein said first and second switching means are switched in response to an output from a reproduced signal deriving means including means for calculating an output resolution from the signals reproduced from the selected one of said plurality of head means and means for comparing the output from the calculating means with at least one predetermined value.

14. A waveform equalizing circuit according to claim 13, wherein said reproduced signal deriving means includes an A/D converter for sampling two signals having different predetermined frequencies from the reproduced signals and digitizing the two signals, said calculating means including a divider for calculating the output resolution in accordance with the two signals, and said comparing means including a comparator for comparing the output from the divider with the at least one predetermined value.

15. A waveform equalizing circuit according to claim 11, wherein the magnetic recording device is a magnetic disc device including a rotary magnetic disc wherein signals are recorded and reproduced from different tracks on the rotary magnetic disc.

16. A waveform equalizing circuit according to claim 11, wherein the different amounts of attenuation and delay are coordinated with the different ones of said plurality of head means so as to compensate for variations in characteristics of the different ones of said plurality of head means.

* * * * *